No. 862,081. PATENTED JULY 30, 1907.
N. D. LEVIN.
RESILIENT APPROACH FOR RACK RAILS.
APPLICATION FILED DEC. 17, 1906.

Witnesses.
Edward T. Wray
Edna K. Reynolds

Inventor
Nils D. Levin
by Parker & Carter
Attorneys.

UNITED STATES PATENT OFFICE.

NILS DAVID LEVIN, OF CHICAGO, ILLINOIS, ASSIGNOR TO GOODMAN MANUFACTURING COMPANY, OF CHICAGO, ILLINOIS, A CORPORATION OF ILLINOIS.

RESILIENT APPROACH FOR RACK-RAILS.

No. 862,081.              Specification of Letters Patent.          Patented July 30, 1907.

Application filed December 17, 1906. Serial No. 348,352.

*To all whom it may concern:*

Be it known that I, NILS DAVID LEVIN, a citizen of the United States, residing at Chicago, in the county of Cook and State of Illinois, have invented a certain new and useful Improvement in Resilient Approaches for Rack-Rails, of which the following is a specification.

This invention relates to approaches for rack rails, and has for its object to provide a new and improved device of this description.

Figure 1:
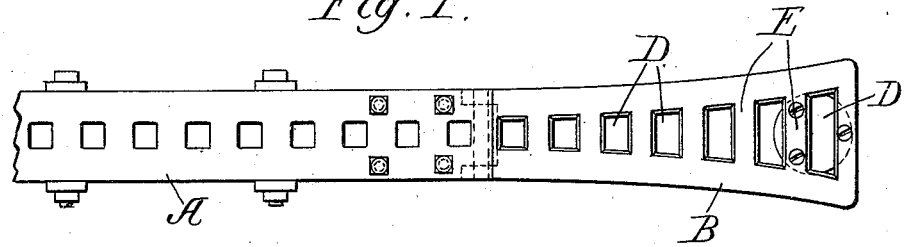
Figure 2:
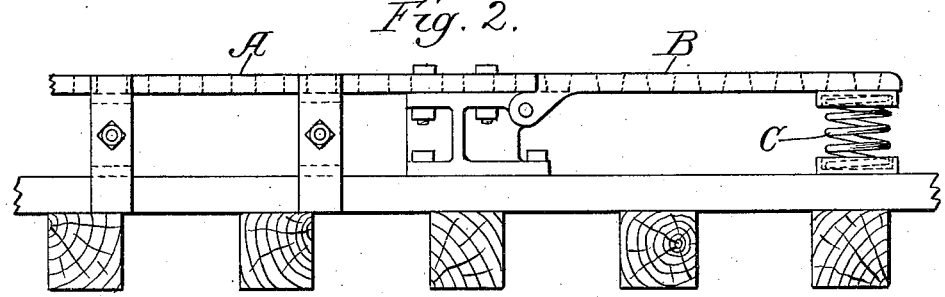
Figure 3:
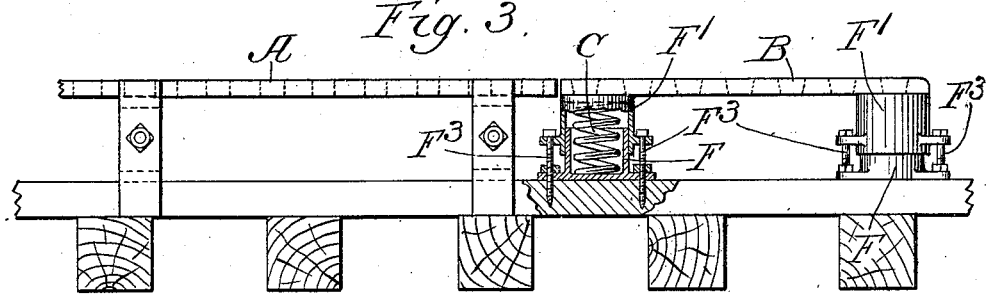
Figure 4:
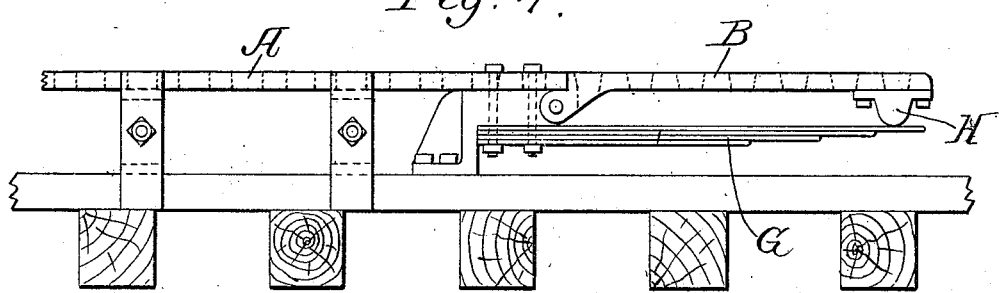

Referring now to the accompanying drawings, Figure 1 is a plan view of a rack rail embodying the invention; Fig. 2 is a side elevation of Fig. 1; Figs. 3 and 4 are views showing modified constructions.

In the operation of rack locomotives it often happens that the rack is not continuous, and the locomotive becomes disengaged from and has to then be again engaged with such rack. In securing this proper engagement with the rack there is often difficulty, for, unless the sprocket wheel of the locomotive is exactly in step so that the teeth will register with the openings in the rack, it will ride upon the rack and tend to bend the axle or rail and otherwise injure the mechanism.

One of the objects of this invention is to prevent such injury and insure the proper connection between the rack and the sprocket wheel of the locomotive.

Referring to the drawings, there is shown a portion A of the rack which may be of any suitable construction, and which is firmly fastened in position. Connected with the portion A is a part B which may be termed the approach. The approach B is arranged so that when the sprocket wheel of the locomotive strikes it and is not in proper relation to it, it will give, and it is also arranged so as to cause the proper meshing of the sprocket wheel as the locomotive proceeds.

As shown in Figs. 1 and 2, the approach B is pivotally connected with the rack A in any desired manner. Said approach between its pivotal point and its end is provided with a resilient support. As shown in these drawings this support consists of a spring C. The openings D in the approach and the teeth E are longer at the end of the approach and gradually diminish in size towards the rack. These teeth are beveled in all directions so as to force the teeth of the sprocket wheel into proper mesh as the locomotive proceeds so that when the locomotive strikes the rack A the teeth of the sprocket wheel mesh with the teeth of the rack.

In Fig. 3 the approach B is not connected with the rack A, and is mounted upon separate supports, one or both of which may be resilient. These supports may consist of springs C. In this construction the springs are preferably provided with a telescoping casing. One part F of the casing is connected to a suitable fixed support, and the other part F¹ with the approach. The two parts may be held together by suitable bolts or holding pieces F³ which are loosely connected with one of the parts. The telescoping casing is arranged so that it holds the approach in position and prevents the side or endwise displacement thereof.

In Fig. 4 the approach B is pivotally connected with the rack A and the resilient effect is secured by a spring device G. The spring device and the approach are both connected with the rack, or some part associated therewith, and the spring projects forward towards the end of the approach and is engaged by a suitable projection H thereon.

In the operation of the device when the locomotive moves so that the sprocket wheel strikes the approach B it gives so as to reduce the shock, and the beveled faces of the teeth cause the sprocket wheel to mesh with the teeth of the rack before the rack is reached.

I claim:

1. The combination with a rack rail of a resilient approach movable with relation thereto.

2. The combination with a rack rail of a resilient approach movable with relation thereto, said approach provided with beveled teeth increasing in size towards the outer end of the approach.

3. An approach for rack rails comprising a part associated with the rail and an elastic support therefor which permits it to give when the sprocket wheel fails to mesh properly with it.

4. The combination with a rack rail of an approach therefor movably connected at one end to a fixed support and elastically supported at the other end.

5. An approach for rack rails comprising a movable portion provided with suitable teeth, means for holding said portion in alinement with the rack, and a spring connected with said approach and with a fixed support so as to elastically hold the approach in position.

NILS DAVID LEVIN.

Witnesses:
EDWARD T. WRAY,
DONALD M. CARTER.